United States Patent [19]
Gesell et al.

[11] Patent Number: 5,623,360
[45] Date of Patent: *Apr. 22, 1997

[54] TIME DELAY BEAM FORMATION

[75] Inventors: Leslie H. Gesell; Terry M. Turpin, both of Columbia, Md.

[73] Assignee: Essex Corporation, Columbia, Md.

[ * ] Notice: The term of this patent shall not extend beyond the expiration date of Pat. No. 5,390,046.

[21] Appl. No.: 387,414

[22] Filed: Feb. 13, 1995

Related U.S. Application Data

[63] Continuation-in-part of Ser. No. 45,062, Apr. 12, 1993, Pat. No. 5,390,046, which is a continuation-in-part of Ser. No. 806,697, Dec. 12, 1991, Pat. No. 5,202,776.

[51] Int. Cl.$^6$ ........................................ G02F 1/11
[52] U.S. Cl. .................. 359/287; 359/20; 359/310; 359/577; 359/578; 356/345; 250/550
[58] Field of Search ............................ 359/17, 20, 561, 359/305, 306, 310, 287, 578, 577; 356/345; 250/550, 227.12

[56] References Cited

U.S. PATENT DOCUMENTS

Re. 30,166  12/1979  Lee ............................ 365/122
4,644,267    2/1987  Tsui et al. .................. 324/77 K
5,097,351    3/1992  Kramer ........................ 359/17
5,179,463    1/1993  Kramer ....................... 359/204

Primary Examiner—Georgia Y. Epps
Assistant Examiner—Thomas Robbins
Attorney, Agent, or Firm—Loeb & Loeb LLP

[57] ABSTRACT

Optical systems are disclosed which are capable of generating and rapidly changing time delays of electrical signals for true time delay beam formation and beam steering and for signal processing applications. The systems utilize an interferometer configuration. A first optical modulator in a first leg of the interferometer is used to modulate coherent light with the signal to be delayed. In a second leg of the interferometer, a second optical modulator provides beam steering to a prism stack, which produces a set of plane reference waves having a range of orientations required to generate a desired range of time delays. Preferably the optical modulators are acousto optic Bragg cells. Alternatively, a stack of lens pairs or diffractive optical elements or a holographic optic element may be used in place of the prism stack. The modulated optical signal from the first leg interferes on an array of photodiodes with the reference waves from the second leg. The resulting electrical signals out of the photodiodes are delayed replicas of the signals driving the optical modulator in the first leg.

17 Claims, 11 Drawing Sheets amplitude* and phase shift control

EO amplitude* and phase modulators

\* Implementation of amplitude control is dependent on the intended application.

TIME DELAY BEAM FORMATION

The present application is a continuation-in-part of U.S. application Ser. No. 08/045,062, filed Apr. 12, 1993, now U.S. Pat. No. 5,390,046, issued Feb. 14, 1995, which was a continuation-in-part of U.S. application Ser. No. 07/806,697, filed Dec. 12, 1991, now U.S. Pat. No. 5,202,776, issued Apr. 13, 1993.

BACKGROUND OF THE INVENTION

1. Field of the Invention

The present invention relates to a system for generating and rapidly changing the time delays of electrical signals for true time delay beam formation and steering.

2. Description of Related Art

The use of wide aperture, wide bandwidth phase steered array antennas for transmitting and receiving wideband signals is a known technique. Such known antennas suffer from a problem of beam dispersion or broadening when steering away from the array normal.

Attempts have been made to avoid this problem of beam dispersion through the use of time delays between the array elements. One approach for implementing true time delay beam formation is to switch in different lengths of signal transmission delay lines between the common signal source and the antenna array elements. This known approach tends to be bulky and cumbersome for scanning an array with a large number of array elements over a wide range of nearly continuous angles.

It is an object of the present invention to provide a system that is simple and that does not require a bulky and complex implementation.

It is a further object of the present invention to provide a system for implementing true time delay beam formation that may fit into a small lightweight package, that is relatively rugged, and that consumes relatively small amounts of power.

SUMMARY OF THE INVENTION

In accordance with the present invention, these and other objectives are achieved by providing a system in which time delays may be generated by using an acousto-optic (AO) Bragg cell as a continuous tapped delay line. Selected points in the Bragg cell may be optically mapped to the output. The optical mapping may be controlled using additional optical and acousto-optical devices. The optical mapping may make use of prisms and/or holographic optical elements and/or pairs of lenses, in addition to other standard passive optical elements.

A system in accordance with the present invention is capable of generating and rapidly changing time delays for true time delay beam formation and steering. A system in accordance with the present invention enables a time delay beam formation array to simultaneously scan multiple beams rapidly over a continuum of angles.

A system in accordance with the present invention may be used, for example, in airborne reconnaissance and surveillance, space-based radar, satellite communications, or large space-based arrays, where size, weight and power are major considerations.

A system in accordance with the present invention does not require a bulky and complex implementation. The hardware required to implement a true time delay beam formation system in accordance with the present invention may fit into a small lightweight package, may be rugged, and may consume relatively small amounts of power. The simplicity and compactness of the system dramatically reduces unwanted variability in the relative time delays. The present invention has commercial applications in other environments that benefit from the generation and dynamic control of one or more delays of a signal. Such applications include filtering of a temporal signal and the removal of the detrimental effects of multipath on a temporal signal.

BRIEF DESCRIPTION OF THE DRAWINGS

A detailed description of a preferred embodiment of the present invention will be made with reference to the accompanying drawings.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
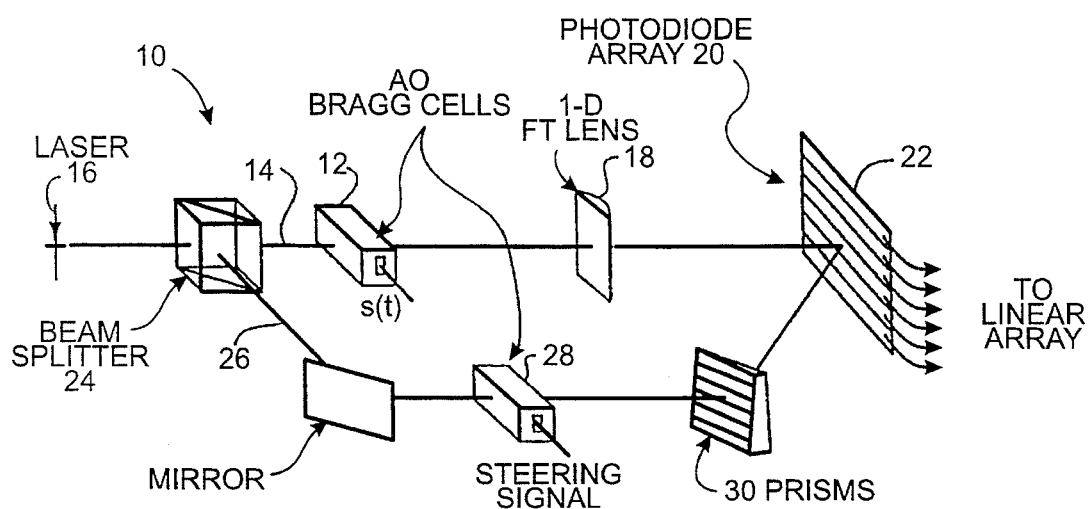
FIG. 1 shows an example of an acousto-optic system for generating time delays for a one-dimensional transmitting array.

FIG. 1 shows an example of an acousto-optic system 10 for generating time delays for a one-dimensional transmitting array. The skilled artisan will recognize a resemblance between the system 10 shown in FIG. 1 and a Mach-Zehnder interferometer.

The signal to be transmitted may be represented by s(t), where the complex amplitude of the signal s is a function of time t. The signal s(t) drives an acousto-optic Bragg cell 12 located in a first leg 14 of the interferometer system 10. Coherent light from a laser source 16 may be passed through the Bragg cell 12 and may be modulated by the signal s(t).

A Fourier transform lens 18 may also be provided in the first leg 14 of the interferometer system 10. Light that is passed through the Fourier transform lens 18 is separated into a spectrum. Modulated light exiting from the Bragg cell 12 may be passed through the Fourier transform lens 18, thereby causing the spectrum of the modulated light signal to illuminate an array 20 of wideband photodiodes 22. In the system illustrated in FIG. 1, the photodiode array 20 is preferably located in the Fourier transform plane of the first Bragg cell 12.

Each of the photodiodes 22 in the photodiode array 20 is preferably narrower in one dimension and wider in another dimension. As shown in FIG. 1, for example, each of the photodiodes 22 is narrower in the vertical dimension and wider in the horizontal dimension. The width of each photodiode 22 is preferably large enough to capture the full spectrum of the modulated light signal illuminating the photodiode.

The interferometer system 10 illustrated in FIG. 1 also includes a beam splitter 24. The beam splitter 24 splits the coherent light from the laser source 16 into a first leg 14 and a second leg 26.

The second leg 26 includes a second Bragg cell 28. A beam steering signal may be inserted into the second Bragg cell 28. For a single beam, the beam steering signal may be in the form of a sine wave. For forming and steering multiple beams, multiple sine waves may be used.

The second leg 26 of the interferometer system 10 may also be provided with a stack of prisms 30. The stack of prisms 30 performs the function of creating, from the output of the second Bragg cell 28, a set of plane reference waves having a range of orientations required to generate a desired range of time delays.

More specifically, the prism stack 30 performs the function of taking an input beam from the second Bragg cell 28 at incidence angle θ' and producing multiple output beams at angles θ' proportional to θ'. For example, if the input angle is θ', then the output angles would be aθ'+k, bθ'+k, cθ'+k, etc. The prism stack 30 thereby performs the function of mapping a single angle into multiple angles. The difference between successive output angles of the prism stack 30 is a function of the input angle θ', thereby producing variable differential time delays.

Alternatively, the prism stack 30 may be replaced by a holographic optic element. Such a holographic optic element would similarly perform the function of creating, from the output of the second Bragg cell 28, a set of plane reference waves having a range of orientations required to generate a desired range of time delays. In the two dimensional system shown in FIG. 4, for example, the volume hologram 150 performs substantially the same function as the prism stack 30 in the one-dimensional system shown in FIG. 1. Prisms or volume hologram elements may be used for beam formation in antennas having array elements arranged linearly, as well as antennas having array elements lying along a curve. Alternatively, each prism in the stack of prisms may be replaced by a pair of lenses and/or diffractive optic elements.

Referring to FIG. 1, the optics in the second leg 26 are preferably arranged so that there is a one-to-one correspondence between the photodiodes 22 of the photodiode array 20 and the prisms of the prism stack 30, whereby each photodiode 22 in the photodiode array 20 is illuminated by a reference plane wave output of a corresponding prism of the prism stack 30.

The interferometer system 10 illustrated in FIG. 1 is arranged so that the signal spectrum associated with the first leg 14 and the reference plane wave associated with the second leg 26 interfere at the photodiode array 20. Each of the photodiodes 22 detects the interference between the signal spectrum and the reference plane wave. Each of the photodiodes 22 produces an output signal that corresponds to the detected interference, integrated over the width of the photodiode. Since the width of each photodiode 22 is preferably large enough to capture the full signal spectrum, the integration occurs over the full spectral frequency.

The output signal of each of the photodiodes 22 corresponds to a delayed replica of the input signal. The amount of the delay is determined by the angle between the reference plane wave and the surface of the photodiode 22.

The output of the photodiode array 20 may be sent to a linear transmitting array (not shown). In a preferred embodiment, there is a one-to-one correspondence between each photodiode 22 of the photodiode array 20 and each element of the transmitting array.

The following paragraphs provide a mathematical description of how a system such as that shown in FIG. 1 may generate variable time delays.

Figure 2:
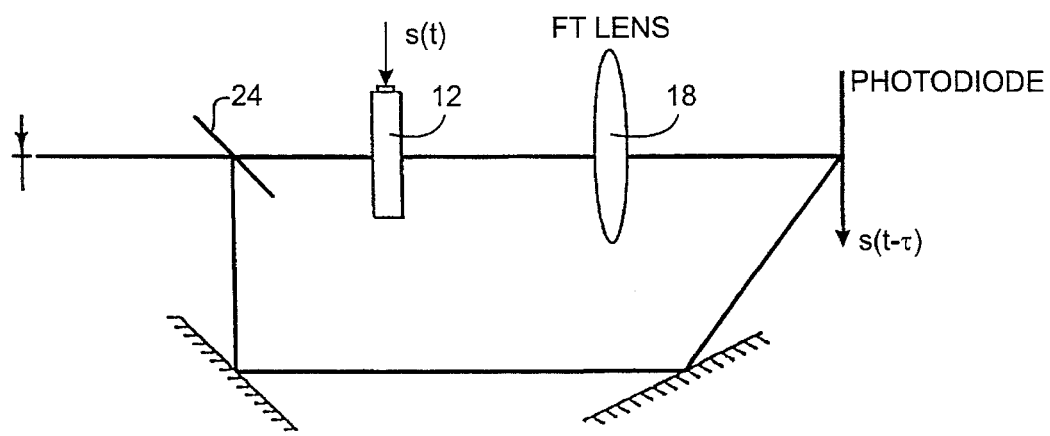
FIG. 2 shows an example of an acousto-optic system for generating one time delay.
Figure 3:
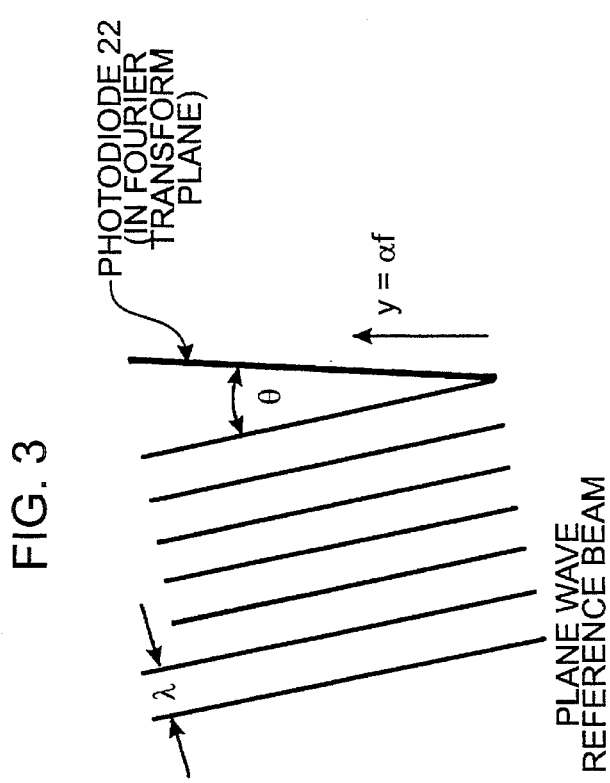
FIG. 3 shows an example of a reference wave on a photodiode.

As shown in FIGS. 2 and 3, a reference plane wave makes an angle θ with the surface of a photodiode 22. The reference plane wave at the surface of the photodiode 22 may be represented mathematically by:

$$r(t,y) = e^{j2\pi(f_0 t - \frac{y}{\lambda}\sin\theta)} = e^{j2\pi f_0(t - \frac{y}{c}\sin\theta)} \quad (1)$$

where y represents the physical distance along the photodiode 22, λ represents the optical wavelength of the reference plane wave, $f_o$ represents the optical carrier frequency of the reference plane wave, and c represents the velocity of light. The spectral frequency f of the signal in the Fourier transform plane is proportional to the physical distance y along the photodiode 22. Therefore, a factor τ, having units of time, may be defined such that:

$$f\tau = -f_0 \frac{y}{c} \sin\theta \quad (2)$$

As indicated in Equation (2), the factor τ is proportional to sin(θ). The reference plane wave at the photodiode may therefore be expressed as, $$r(t,f) = e^{j2\pi f \tau} e^{j2\pi f_0 t} \quad (3)$$

In the first leg 14 of the interferometer system 10, a coherent optical beam, modulated and Doppler shifted by the frequency component S(f) of the signal, also illuminates the photodiode 22. At the photodiode 22 this modulated coherent beam has the following functional form:

$$S(f) \cdot e^{j2\pi f t} e^{j2\pi f_0 t} \quad (4)$$

The oscillators, $$e^{j2\pi f t} \quad (5)$$

result from the fact that each frequency component of the signal in the first Bragg cell 12 Doppler shifts the optical carrier by the frequency of that component.

To negate the Doppler shift of the steering signal, a point modulator may be placed in the second leg 26 of the interferometer system to downshift the frequency of the optical beam by the frequency of the steering signal. This Doppler shift could also be removed electrically at the photodiode output.

The sum of the beams illuminating the photodiode may be square-law detected using the photodiode. The output d(t) of the photodiode at each instant of time is equal to the square-law detection integrated along the length of the photodiode (i.e., integrated with respect to the frequency f):

$$d(t) = \int |r(t,f) + S(f) \cdot e^{j2\pi ft} e^{j2\pi f_0 t}|^2 df \quad (6a)$$

$$= \int |e^{j2\pi f\tau} e^{j2\pi f_0 t} + S(f) \cdot e^{j2\pi ft} e^{j2\pi f_0 t}|^2 df \quad (6b)$$

$$= \int [1 + |S(f)|^2 + 2\,\text{Real}(S(f)e^{j2\pi f(t-\tau)})] df \quad (6c)$$

$$= \text{bias} + 2\text{Real}[\int S(f)e^{j2\pi f(t-\tau)} df] \quad (6d)$$

Consequently, the photodiode output d(t) may be represented as, $$d(t) = bias + 2Real[s(t-\tau)] \quad (7)$$

As indicated in Equation (7), the photodiode output d(t) is equal to the input signal s(t) delayed by a time τ. The delay time τ is proportional to the sine of the angle of incidence of the reference plane wave on the photodiode. The bias allows negative and positive values of the delayed signal to be represented.

A physical explanation of how an acousto-optic system (as shown, for example, in FIGS. 1, 2 and 3) can produce an output signal that is a delayed replica of the input signal, with the amount of the delay being determined by the angle of incidence of the reference plane wave on the photodiode, is as follows:

Since the photodiode coherently sums all of the frequency components of the signal s(t), only those components of the spectrum that are in phase with one another, after being phase shifted by the reference signal, will lead to a significant output signal relative to the bias. Since the reference signal is a plane wave, the component of the signal spectrum, in optical form, that contributes to an output signal must also be a plane wave if, after being phase shifted by the reference signal, all points on the photodiode are to be at the same phase. Referring to FIG. 1, for example, components of the optical signal that contribute to a plane wave in the Fourier Plane (at the photodiode array 20) come from a single point in the Bragg cell 12. Thus, the reference wave selects which point in the Bragg cell 12 (a delay line) is mapped to the output. The angle of the reference wave determines the delay of the output signal relative to the input signal.

The systems described above relate generally to systems for generating a time delay for a one-dimensional transmitting array. In the above-described systems, the photodiode array is preferably located in the Fourier transform plane of the first Bragg cell. Time delays may also be generated by placing the photodiode array in the Image Plane of the first Bragg cell. Placement of the photodiode array in the Image Plane of the first Bragg cell is particularly appropriate for two-dimensional array beam formation.

Figure 4:
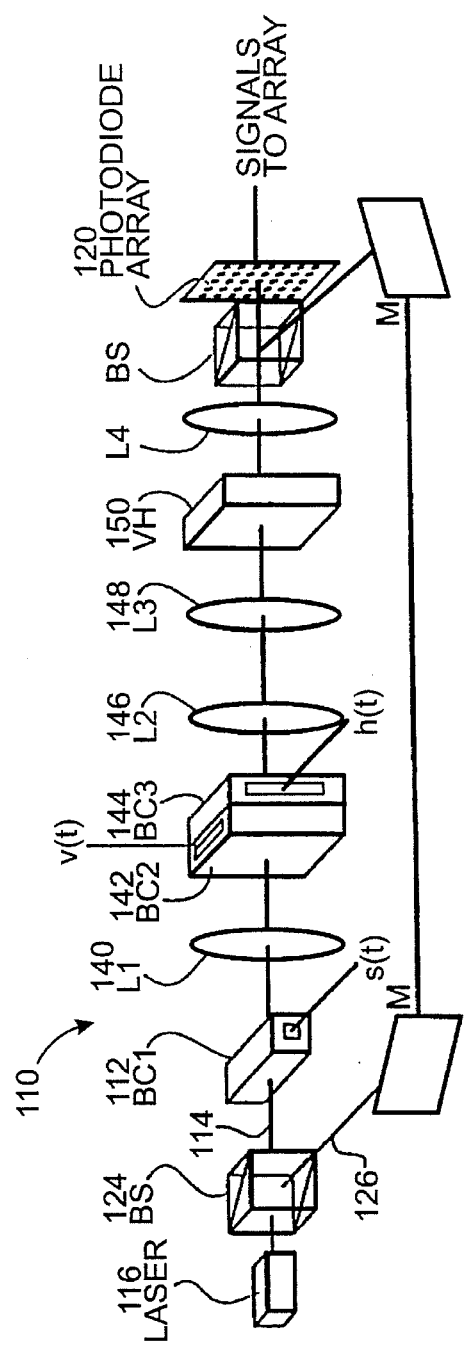
FIG. 4 shows an example of an acousto-optic system for generating time delays for a two-dimensional transmitting array.

FIG. 4 shows an example of a system 110 for generating time delays of a signal for forming and steering the beam of a two-dimensional (planar) array. The skilled artisan will recognize a resemblance between the system 110 shown in FIG. 4 and a Mach-Zehnder interferometer.

In the system 110 illustrated in FIG. 4, time delays may be generated by placing a photodiode array 120 in an Image Plane of a first Bragg cell 112 and optically mapping points in the first Bragg cell 112 onto the photodiode array 120. The electrical outputs of the photodiode array 120 are time delayed replicas of the signal s(t). These time delayed replicas of the signal s(t) are then sent to the elements of the planar array.

In the system 110 for a two-dimensional transmitting array shown in FIG. 4, each of the photodiodes in the photodiode array 120 sees only the image of a single point in the first Bragg cell 112. Consequently, both the vertical and horizontal dimensions of each photodiode in the photodiode array 120 are preferably relatively small. In contrast, in the system 10 for a one-dimensional transmitting array shown in FIG. 1, the photodiode array 20 is preferably located in the Fourier transform plane of the first Bragg cell 12. The width of each photodiode 22 in the photodiode array 20 is preferably large enough in the horizontal dimension to capture the full spectrum of the modulated light signal illuminating the photodiode.

As shown in FIG. 4, a collimated coherent laser beam from a laser source 116 is divided into a first leg 114 and a second leg 126 by a beam splitter 124. The optical beam passing through the second leg 126 provides a reference at the photodiode array 120 for heterodyne detection, so that the voltages from the electrical signals out of the photodiode array 120 are proportional to the voltages of the time delayed replicas of the input signal to the device. Although the embodiment illustrated in FIG. 4 shows a reference beam generated by a beam splitter 124, it is noted that neither the reference beam nor the beam splitter are required elements of the invention. For example, a reference beam may be provided by a separate coherent light source. Alternatively, if the signal to be delayed is of an on-off modified type, then no reference beam may be required.

In the first leg 114 the input electrical signal s(t), the signal to be transmitted by the RF planar array, drives the first acousto-optic Bragg cell 112. The result is that the first Bragg cell 112 which is a delay line contains a time span of the signal, in acoustic form, from time $t-T_a$ to time t, where $T_a$ represents the time aperture of the first Bragg cell 112. The coherent laser beam passing through the first Bragg cell 112 may be modulated by the signal and Fourier transformed by a first lens 140. Points in the first Bragg cell 112 are plane waves at a second Bragg cell 142 and a third Bragg cell 144. The angular orientations of the plane waves are determined by the positions of the points in the first Bragg cell 112.

The mapping of points in the first Bragg cell 112 to the photodiode array 120 is controlled by the frequencies of a vertical electrical signal v(t) and a horizontal electrical signal h(t) that drive the second Bragg cell 142 and the third Bragg cell 144. Both the vertical signal v(t) and the horizontal signal h(t) are preferably sine waves. The signal in the second Bragg cell 142 changes the angular orientation of the plane waves passing through the second Bragg cell with respect to vertical. The signal in the third Bragg cell 144 changes the angular orientation of the plane waves passing through the third Bragg cell with respect to horizontal.

The positions and focal lengths of a second lens 146 and a third lens 148 are such that the volume hologram 150 is also in the Fourier transform plane of the first Bragg cell 112, so that points in the first Bragg cell 112 are plane waves in the volume hologram. The volume hologram 150 is also approximately in the Image Planes of the second Bragg cell 142 and the third Bragg cell 144. Therefore, the vertical signal v(t) and the horizontal signal h(t) control the angular orientation of the plane waves at the volume hologram 150.

The volume hologram 150 is constructed such that the plane waves at the volume hologram (points in the first Bragg cell 112) are mapped into points on the photodiode array 120. The mapping is determined by the angular orientation of the plane waves at the volume hologram 150. The mapping of points in the first Bragg cell 112 onto the photodiode array 120, and therefore the steering angle of the planar array, is controlled by the vertical signal v(t) and the horizontal signal h(t).

A large set of point-to-point mappings may be required to generate the different time delays necessary for pointing an RF planar array in a large number of directions. Referring to FIG. 4, for example, the mapping of points from the first Bragg cell 112 is not required to be one-to-one for a planar array. For each orientation of the beam, some number of points in the Bragg cell 112 may be mapped to a larger number of photodiodes in the photodiode array 120.

Figure 5:
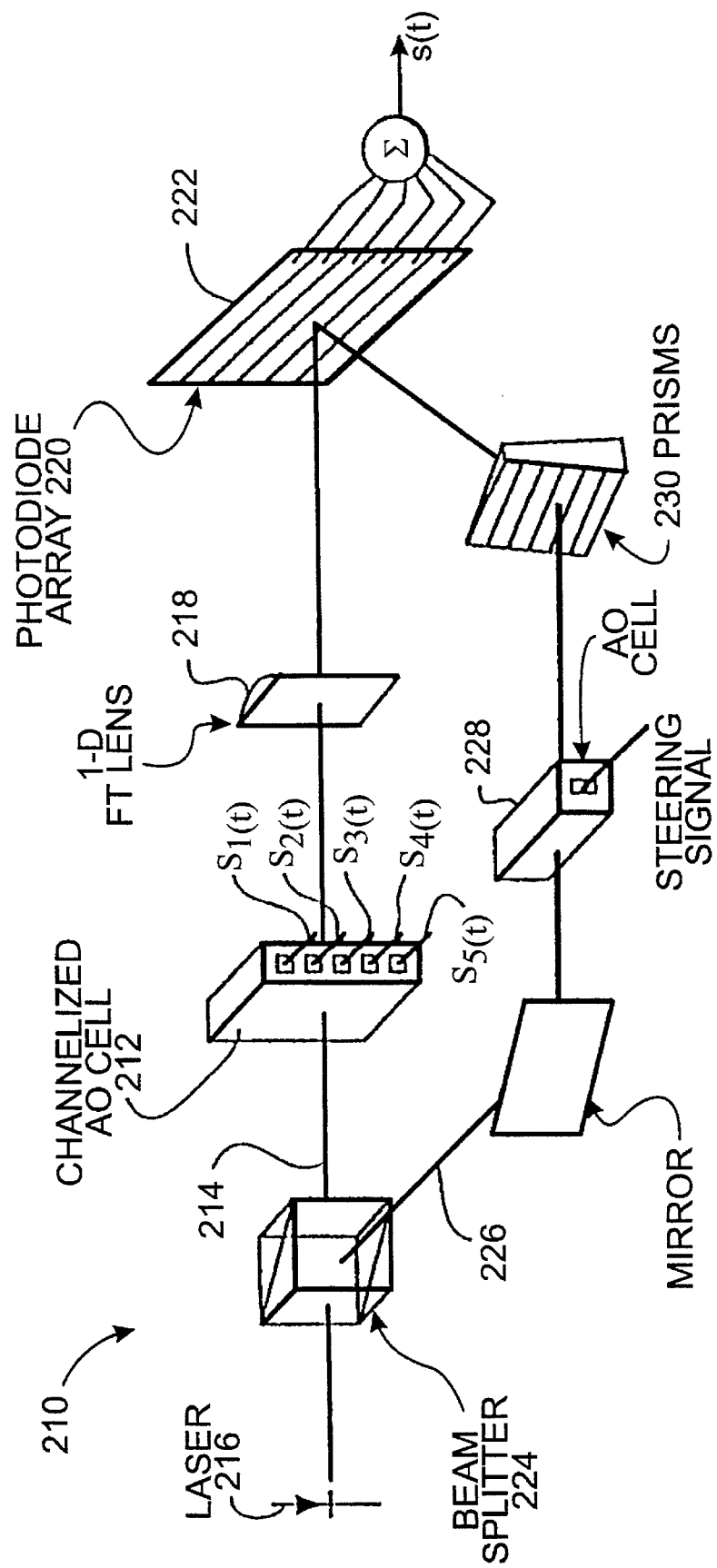
FIG. 5 shows an example of an acousto-optic system for generating time delays for a one-dimensional receiving array.

FIG. 5 shows an example of an acousto-optic system 210 for generating a time delay for a one-dimensional receiving array. To form a beam in a particular direction with a receiving linear RF array, the outputs of the array elements must be delayed relative to one another and then summed. The amount of relative delay between the array elements may be determined by the spacing between the array elements and by the angle between the beam and the normal to the linear array.

The principle of how the system 210 illustrated in FIG. 5 delays a signal is essentially the same as for the system 10 for a one-dimensional transmitting array as shown in FIG. 1. In a first leg 214 of the system 210 illustrated in FIG. 5 a multi-channel Bragg cell 212 is used. The number of channels of the Bragg cell 212 is preferably equal to the number of antenna elements in the linear array. An electrical signal from each element of the receiving array drives a channel of the multi-channel Bragg cell 212. The signal in a channel of the multi-channel Bragg cell 212 is optically Fourier transformed onto a corresponding photodiode 222. As previously described herein, the electrical output of the photodiode 222 is a time delayed replica of the electrical signal that drives the corresponding channel of the multi-channel Bragg cell 212. The time delay may be determined by the angle between the reference plane wave from a second leg 226 of the illustrated system 210 and the face of the photodiode 222.

The second leg 226 of the illustrated system 210 functions substantially identically to the second leg 26 in the system 10 shown in FIG. 1 to generate time delays for transmitting a signal with a one-dimensional array. A stack of prisms 230 in the second leg 226 results in reference plane waves having a distribution of angles incident on the photodiode array 220. This allows a single channel Bragg cell 228, preferably driven with sine waves, to control a range of time delays.

The electrical outputs of the photodiodes 222 may be summed electrically. This sum is the signal arriving at the linear array from the direction determined by the frequency of the steering signal driving the Bragg cell 228 in the second leg 226 of the illustrated system 210.

The system shown in FIG. 5 may also be used for the formation and steering of beams for two-dimensional (planar) receiving arrays.

The projection of a pointing direction of a receiving array is a straight line on the face of the array. The time delays are all the same on each line on the array that is normal to this projection of the beam pointing direction. Therefore, to form a beam with a planar receiving array using the system shown in FIG. 5, the outputs of the array elements that lie along the lines normal to the projection of the desired beam pointing direction may first be summed electrically, one sum for each line. The spacing between the lines is approximately equal to the spacing between the antenna array elements that lie along the projection of the beam pointing direction onto the face of the antenna. The electrical sums may then be used to drive the channels of the channeling AO Bragg cell 212 shown in FIG. 5. The steering signal in this case determines the angle of the formed beam with respect to the normal to the face of the array.

The electrical outputs of the antenna array elements may be phase shifted before exciting the array elements to compensate for the small deviations of positions of the array elements from the lines normal to the pointing direction.

The following description is directed to an example of what may be referred to as an "Image Plane" version of the systems described hereinabove for time delay beam formation with a linear receiving array, and in particular an example of an Image Plane version of a system resembling the system 10. The system 10 may be referred to as a "Fourier Plane" architecture. It is believed that such "Image Plane" architectures, examples of which are described herein, may have certain advantages in terms of ease of implementation as compared with "Fourier Plane" architectures. This appears to be particularly so in the case of transmitting or receiving wideband signals.

Figure 6:
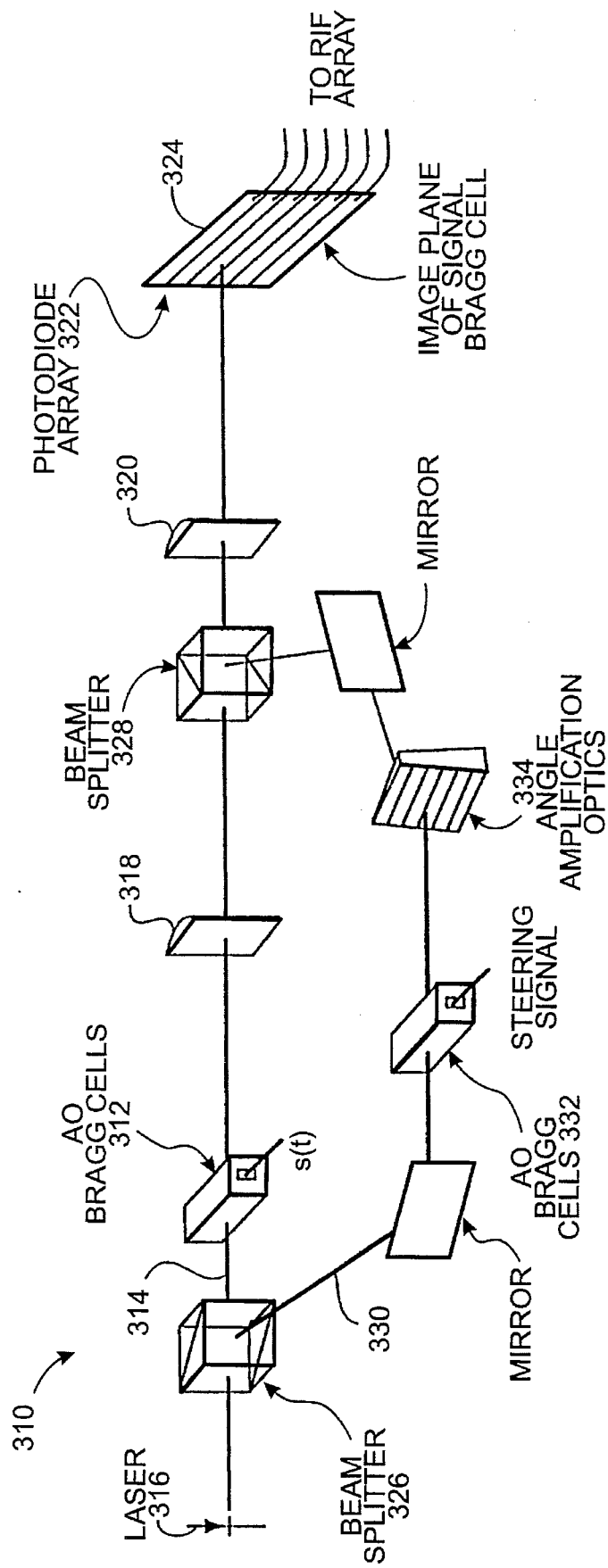
FIG. 6 shows an example of an acousto-optic Image Plane architecture for one-dimensional linear transmitting arrays.

The spectrum of a signal may tend to become "wider" at higher bandwiths, thereby requiring the use of wider photodiodes. However, higher bandwidth photodiodes may also tend to be smaller. FIG. 6 shows an example of an acousto-optic Image Plane system 310 for generating time delays for one dimensional linear transmitting arrays. The skilled artisan will recognize a resemblance between the system 310 shown in FIG. 6 and a Mach-Zehnder interferometer.

In the embodiment shown in FIG. 6, the signal to be transmitted may be represented by s(t), where the complex amplitude of the signal s is a function of time t. The signal s(t) drives an acousto-optic Bragg cell 312 located in a first leg 314 of the interferometer system 310. Coherent light from a laser source 316 may be passed through the Bragg cell 312 and may be modulated by the signal s(t).

A pair of lenses 318 and 320 may be provided for imaging the output of the Bragg cell 312 onto each of the photodiodes 324 in the photodiode array 322.

In the embodiment of the invention illustrated in FIG. 6, the aperture of the Bragg cell 312 is imaged across each photodiode 324. The embodiment illustrated in FIG. 6 therefore does not require as wide a photodiode as the embodiment of FIG. 1, in which the spectrum of the signal is spread across each photodiode 22 and each photodiode 22 is preferably wide enough to catch the full spectrum. The embodiment illustrated in FIG. 6 may therefore be preferable for some higher bandwidth applications.

In the embodiment shown in FIG. 6, each of the photodiodes 324 is preferably narrower in one dimension and wider in another dimension. As shown in FIG. 6, for example, each of the photodiodes 324 is narrower in the vertical dimension and wider in the horizontal dimension. The width of each photodiode 324 is preferably large enough to capture the full length of the image of the aperture of the Bragg cell 312. The effect is to image time delays of the signal s(t) across each photodiode of the array 322. A point along the photodiode 324 that is a horizontal distance x from the image of the signal input end of the Bragg cell 312 corresponds to a delayed time t' given by the equation $$t' = t - (x/v_a)$$

where $v_a$ represents the velocity of propagation of the acoustic signal through the Bragg cell 312.

The interferometer-like system 310 illustrated in FIG. 6 also includes two beam splitters 326 and 328. The beam splitter 326 splits the coherent light from the laser source 316 into a first leg 314 and a second leg 330 of the Mach-Zehnder interferometer. The beam splitter 328 recombines the coherent light from the first leg 314 and the second leg 330.

In the embodiment illustrated in FIG. 6 the second leg 330 includes a second Bragg cell 332. A beam steering signal may be inserted into the second Bragg cell 332. For a single beam, the beam steering signal may be in the form of a sine wave. For forming and steering multiple beams, multiple sine waves may be used.

The second leg 330 of the illustrated interferometer system 310 may also be provided with a stack of prisms 334. The stack of prisms 334 performs the function of creating, from the output of the second Bragg cell 332, a set of plane reference waves having a range of orientations required to generate a desired range of time delays. Each plane reference wave may be focused by a lens 320 to a corresponding reference spot on the photodiodes 324 in the photodiode array 322. The locations of the reference spots on the photodiodes 324 may be determined by the orientations of the reference plane waves exiting from the stack of prisms 334.

More specifically, in the illustrated embodiment the prism stack 334 performs the function of taking an input beam from the second Bragg cell 332 at an incidence angle θ' and producing multiple output beams at angles θ' proportional to θ'. For example, if the input angle is θ', then the output angles would be aθ'+k, bθ'+k, cθ'+k, etc. The prism stack 334 thereby performs the function of mapping a single angle into multiple angles. The difference between successive output angles of the prism stack 334 is a function of the input angle θ', thereby producing variable differential time delays.

Alternatively, the prism stack 334 may be replaced by a stack of pairs of lenses having a range of focal lengths and/or diffractive optical elements.

Again referring to the embodiment illustrated in FIG. 6, the optics in the second leg 330 are preferably arranged so that there is a one-to-one correspondence between the photodiodes 324 of the photodiode array 322 and the prisms of the prism stack 334, whereby each photodiode 324 in the photodiode array 322 is illuminated Such a time-delay dependent phase adjustment may be required in systems such as systems 10, 210, 310, and 410, for example, when up converting from the intermediate frequency (IF) of a beam forming processor to the RF of the arrays (for transmitting cases) and when down-converting from the RF of the array to the IF of the beam forming processors (for the receiving cases). Such signal phase shift correction ensures that the phases between time delayed signals are correct at the operating frequency of the array in order to form a beam in a direction corresponding to the time delays.

When using time delay beam formation, it is generally important that the modulation envelop of the wideband signal be properly delayed from one array element to the next. It is also generally important that the phases of the RF carrier of the signals be properly delayed relative to one another in order to form a beam in the desired direction.

The acousto-optic time delay systems described herein, in both the Fourier Plane and Image Plane embodiments, are capable of correctly delaying the modulation envelope of the wideband signal. The acousto-optic time delay systems described herein, in both the Fourier Plane and Image Plane embodiments, are also capable of correctly phase shifting the carrier at the IF (intermediate frequency) at which the signal is delayed. An additional phase shift correction may be required on the carrier of each of the time delayed signals when translating from the IF of the time delay beam formation system to the RF of the array. The additional phase shift correction Δφ for a time delay τ may be expressed as $$\Delta\phi = 2\pi \cdot \tau \cdot (RF - IF)$$

The technology of using phase shifters at the antenna array elements to phase steer an array is generally well known. This technology may be used to provide the necessary phase shift correction when translating from the IF of the time delay beam formation system to the RF of the array. However, the use of active phase shifters for each of the time delayed signals requires the generation and control of the signals to control the active phase by a reference signal output of a corresponding prism of the prism stack 334.

The interferometer system 310 illustrated in FIG. 6 is preferably arranged so that the signal associated with the first leg 314 and the reference signal associated with the second leg 330 interfere at the photodiode array 324. Each of the photodiodes 324 detects the interference between the signal and the reference spot. Each of the photodiodes 324 produces an output signal that corresponds to the detected interference.

Figure 7:
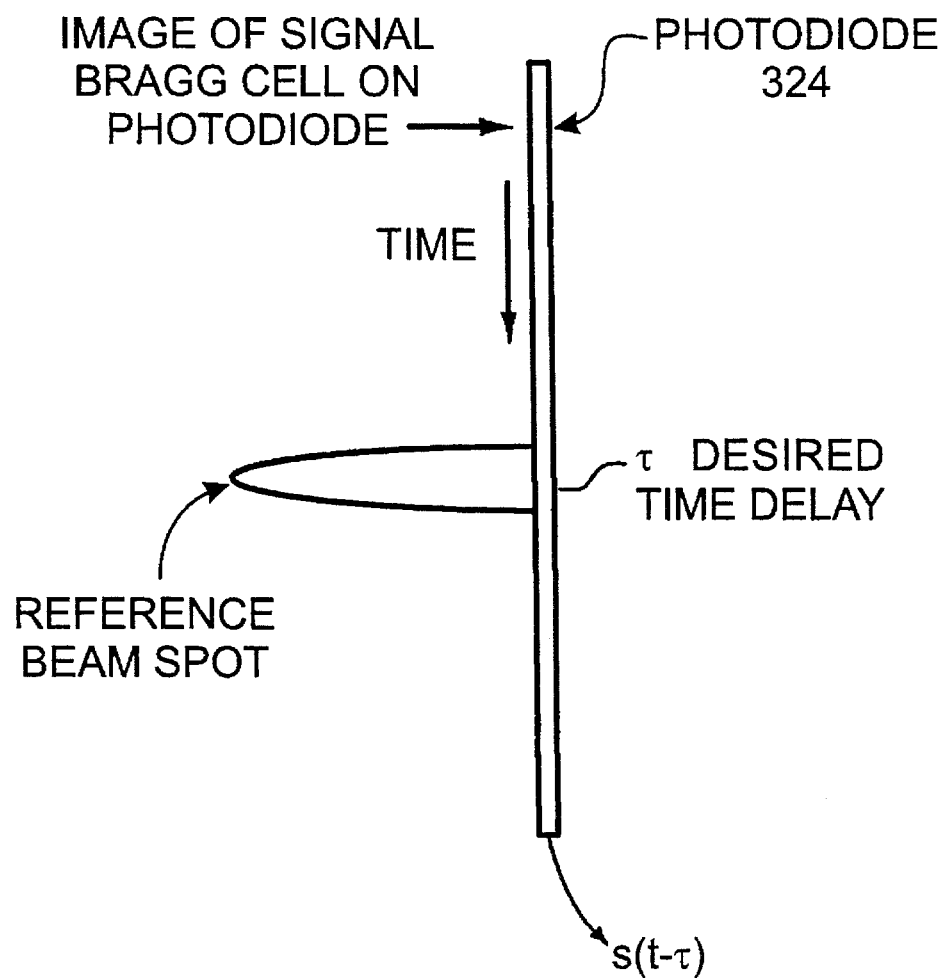
FIG. 7 shows an example of a delay determined by the position of a reference beam spot on a photodiode in an Image Plane architecture.

The output signal of each of the photodiodes 324 corresponds to a delayed replica of the input signal s(t) plus a bias, time variations of which may need to be removed by filtering to preserve the signal. The bias allows for negative and positive values of the signal to be represented. FIG. 7 shows an example of a delay determined by the position of the reference spot on the photodiode. The variation of the photodiode output over time is determined by the interference between the light of the reference spot and the part of the signal from the Bragg cell 312 that is imaged under the reference spot.

The output of the photodiode array 322 may be sent to a linear transmitting array (not shown). In a preferred embodiment, there is a one-to-one correspondence between each photodiode 324 of the photodiode array 322 and each element of the transmitting array.

The following description is directed to an example of what may be referred to as an "Image Plane" version of the systems described hereinabove for time delay beam formation with a linear receiving array, and in particular an example of an Image Plane version of a system resembling the system 210. The system 210 may be referred to as a "Fourier Plane" architecture.

Figure 8:
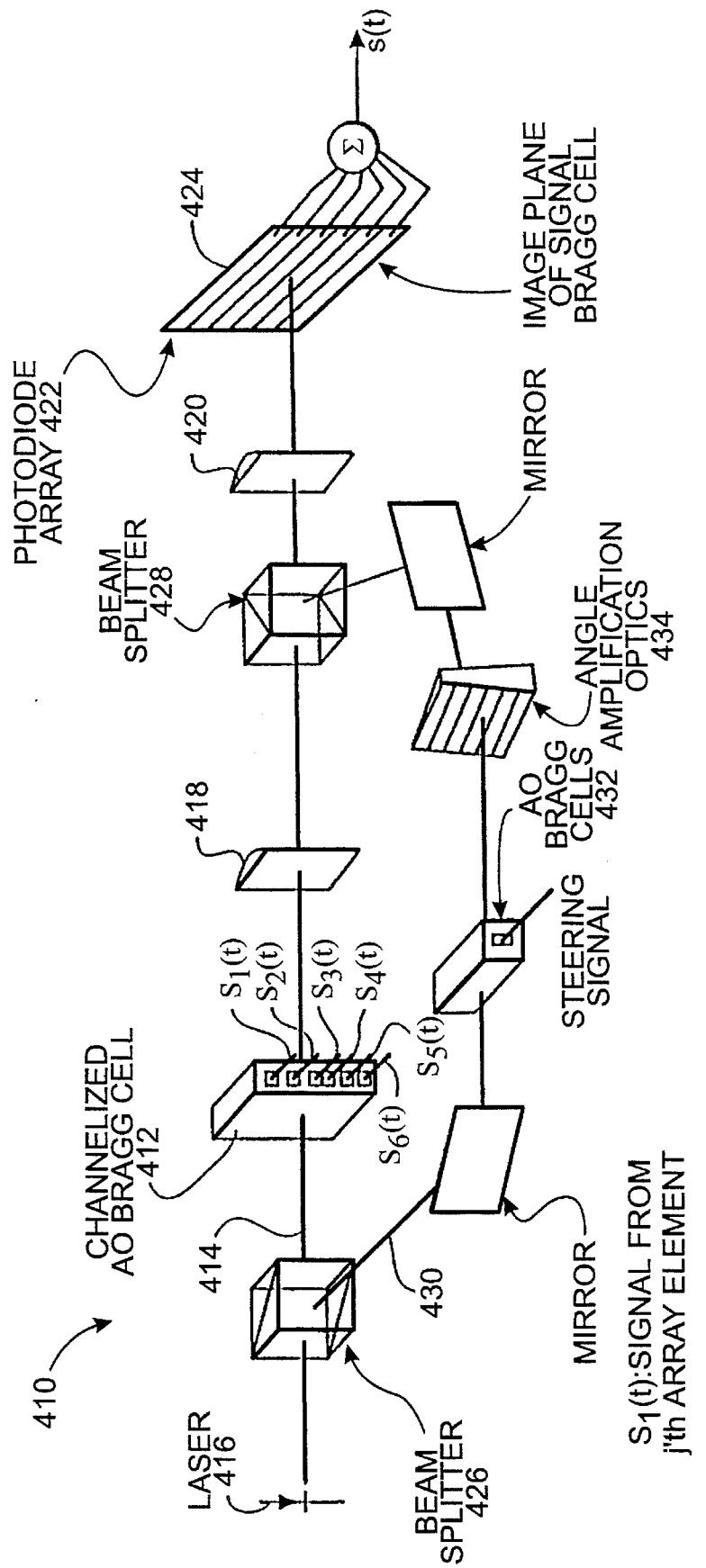
FIG. 8 shows an example of an acousto-optic "Image Plane" architecture for one-dimensional linear receiving arrays.

FIG. 8 shows an example of an acousto-optic "Image Plane" system 410 for generating time delays for one dimensional linear receiving arrays. To form a beam in a particular direction with a receiving RF array, it is important that the outputs of the array elements be delayed relative to one another and then summed. The amount of relative delay between the array elements may be determined by the spacing between the array elements and by the angle between the beam and the normal to the linear array.

The principle of how the system 410 illustrated in FIG. 8 delays a signal is essentially the same as for system 310 for a one-dimensional transmitting array as shown in FIG. 6. In a first leg 414 of the system 410 illustrated in FIG. 8 a multi-channel Bragg cell 412 is used. The number of channels of the Bragg cell 412 is preferably equal to the number of antenna elements in the linear array. An electrical signal from each element of the receiving array drives a channel of the multi-channel Bragg cell 412. The signal in a channel of the multi-channel Bragg cell 412 is imaged onto a corresponding photodiode 422. As previously described herein, the electrical output of the photodiode 422 is a time delayed replica of the electrical signal that drives the corresponding channel of the multi-channel Bragg cell 412. The time delay may be determined by the position of the reference beam spot from a second leg 430 of the illustrated system 410 on the photodiode 422.

The second leg 430 of the illustrated system 410 functions substantially identically to the second leg 330 in the system 310 illustrated in FIG. 6 to generate time delays for transmitting a signal with a one-dimensional array. A stack of prisms 434 in the second leg 430 results in reference spots having a distribution of positions incident on the photodiode array 424. This allows a single Bragg cell 432, preferably driven with sine waves. to control a range of time delays. Alternatively, the stack of prisms may be replaced by pairs of lenses or diffractive optical elements.

The electrical outputs of the photodiodes 424 may be summed electrically. This sum is the signal arriving at the linear array from the direction determined by the frequency of the steering signal driving the Bragg cell 432 in the second leg 430 of the illustrated system 410.

The following description is directed to an example of a method and apparatus for providing signal phase shift correction in a true time delay beam formation system. shifters. This may require a system that is both complex and expensive.

The present invention, in a preferred embodiment, provides a phase shift correction system that requires no external control, is relatively small and simple, and can be made an integral part of an acousto-optic time delay system, such as those described herein. In a preferred embodiment, the method and apparatus for providing signal phase shift correction in a true time delay beam formation system may comprise a passive optical element, in the form of a transparent wedge, that performs the function of adjusting the phase of the carrier of the electrical signals. Alternatively, the transparent wedge may be replaced by a device that introduces a change in optical path length that is a function of position.

Figure 9:
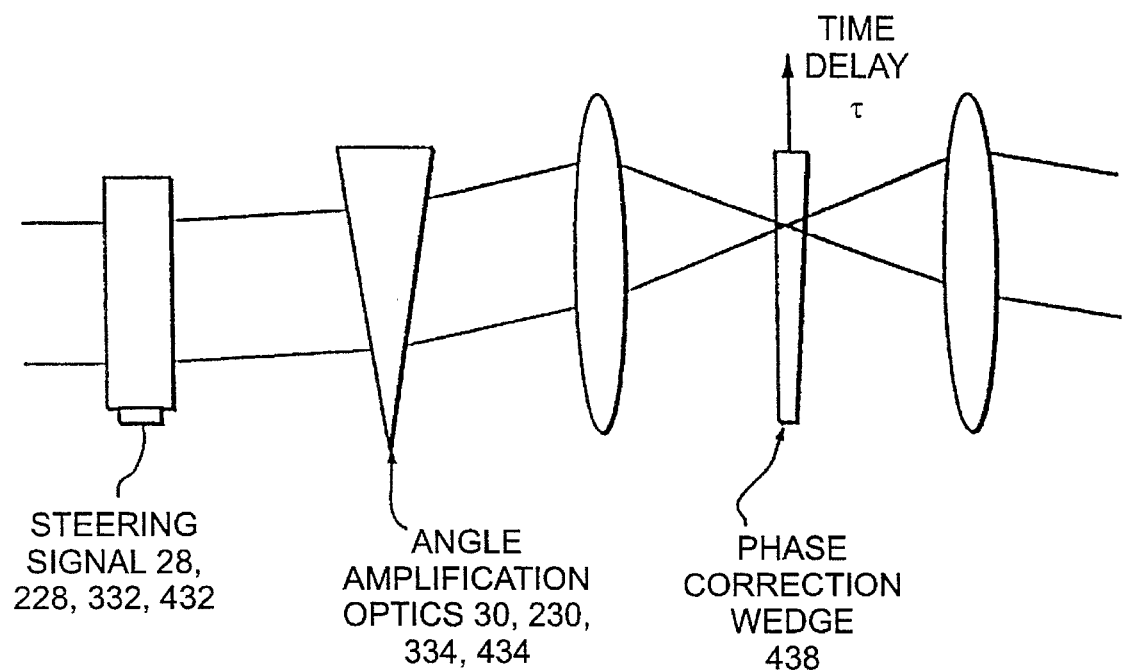
FIG. 9 shows an example of the use of a wedge to provide time delay dependant phase adjustment for translating from the IF (intermediate frequency) of a time delay beam formation processor to the RF of an array.

Referring, for example, to the embodiment of the invention illustrated in FIG. 9, the phase shift correction may be implemented by a transparent phase correction wedge 438. The transparent phase correction wedge 438 may be placed in any Fourier Plane of the steering Bragg cell subsequent to the angle amplification optics in an acousto-optic time delay system. For example, in the time delay system 10 illustrated in FIG. 1, the transparent phase correction wedge 438 may be placed in a Fourier Plane of the steering Bragg cell 28 subsequent to the prism stack 30. In the time delay system 210 illustrated in FIG. 5, the transparent phase correction wedge 438 may be placed in a Fourier Plane of the steering Bragg cell 228 subsequent to the prism stack 230. Similarly, in the time delay system 310 illustrated in FIG. 6, the transparent phase correction wedge 438 may be placed in a Fourier Plane of the steering Bragg cell 332 subsequent to the prism stack 334. In the time delay system 410 illustrated in FIG. 8, the transparent phase correction wedge 438 may be placed in a Fourier Plane of the steering Bragg cell 432 subsequent to the prism stack 434. The taper and orientation of the phase correction wedge 438, as well as the index of refraction of the phase correction wedge, determine the phase shift correction as a function of the time delay $\tau$.

As shown in FIG. 9, the reference beam is focused to a point in a Fourier Plane of the steering Bragg cell. For the acousto-optic Image Plane system shown in FIG. 6, for example, a Fourier Plane of the steering Bragg cell 332 corresponds to an Image Plane of the photodiode array 322. Therefore, the lateral position of the point on the phase correction wedge 438 is proportional to the time delay $\tau$ that will result.

The phase shift correction $\Delta\phi$ in the steering beam that results from passing through the phase correction wedge may be expressed by the equation $$\Delta\phi = x \cdot (n-1)$$

where x represents the thickness of the phase correction wedge at the lateral position at which the steering beam passes through the wedge, and n represents the index of refraction of the wedge material. For a phase correction wedge having substantially planar faces, the thickness x of the phase correction wedge at the lateral position at which the steering beam passes through the wedge is proportional to the desired time delay $\tau$, and the phase shift correction $\Delta\phi$ is proportional to the time delay $\tau$, as required.

The following section describes an example of a method and apparatus for compensating for (and, more particularly, removing or negating) a frequency shift on a time delayed signal that is caused by the steering signal Doppler shifting the optical signal in a steering Bragg cell in a system of the type described herein, and in particular the Fourier Plane architectures for linear transmitting arrays (system 10) and linear receiving arrays (system 210), and the Image Plane architectures for linear transmitting arrays (system 310) and linear receiving arrays (system 410). The control signal in the steering Bragg cell in such systems results in a frequency shift of the optic reference beam by an amount equal to the frequency of the steering signal. The frequency shifted reference beam then frequency shifts the electrical signals out of the photodiodes. Therefore, unless compensation is provided, the RF of a beam formed by the array is shifted in frequency by the frequency of the steering signal.

Several approaches have been suggested to remove the frequency shift imparted by the steering signal. One approach is to lower the center frequency (system intermediate frequency (IF)) of the signal driving the wideband signal Bragg cell by the difference between the frequency of the steering signal for steering the signal in a particular direction and a nominal frequency. A second approach is to adjust the frequency of the local oscillator that is used to up-covert from the steering system IF to the radio frequency (RF) of the array.

The approach utilized in a preferred embodiment of the present invention is to place an acousto-optic point modulator before the beam steering Bragg cell in the reference leg of the acousto-optic true time delay beam former. The point modulator may then be used to shift the frequency of the reference beam in the opposite direction of the frequency shift imparted by the steering Bragg cell. Alternatively, an electro-optic modulator other than an acousto-optic Bragg cell may be used to shift the frequency of the reference beam.

Figure 10:
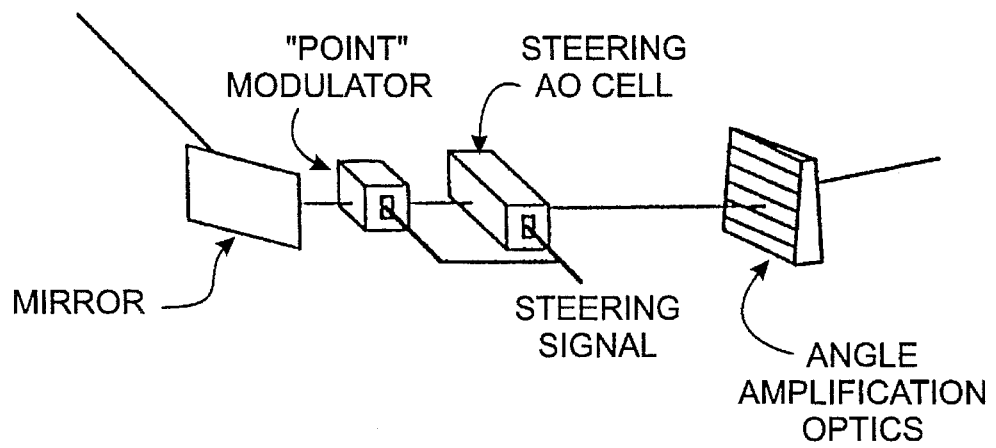
FIG. 10 shows an example of the use of a modulator in a steering leg to compensate for a frequency shift introduced by a steering signal.

FIG. 10 illustrates an example of the use of what may be referred to as a "point" modulator in a reference leg to compensate for the frequency shift introduced by a steering Bragg cell. If the orientation of the steering Bragg cell and the orientation of the optical beams into and out of the steering Bragg cell are such that the frequency of the optical beam is up-shifted by the acoustic signal in the steering Bragg cell, then the "point" modulator before the steering Bragg cell may be oriented so as to down-shift the frequency of the optical beam. Otherwise the modulator may be oriented so as to upshift the frequency of the optical beam. The frequency shift imparted by the steering signal may be removed by placing the "point" modulator in the first leg to shift the frequency of the optical signal in the first leg by the same amount and in the same direction that the steering signal shifts the frequency of the optical signal in the second leg.

Another preferred embodiment of the present invention utilizes an innovative photonics concept for generating and controlling time delays of an electrical signal. Some applications of this preferred embodiment may include, for example, high dynamic range, continuously variable true time delay beamforming for receive and transmit mode of wide bandwidth, narrow beam arrays, and the implementation of transversal filters for signal processing. A signal can be delayed by phase shifting each spectral component by an amount proportional to the frequency of that spectral component and to the time delay desired. The preferred embodiment described below uses an array of fibers containing cavities of different lengths to channelize the signal to be delayed. This approach differs from switched fiber delay units, which merely use the signal transit time through various lengths of fiber to obtain various discrete delays. The fiber cavity approach can finely control delays over a continuum of delays. Some key advantages of the fiber cavity concept over the use of acousto-optic Bragg cells for true-time delay beamforming include, for example, the higher dynamic ranges obtainable (which may be especially important for receive mode), the wider bandwidths obtainable, the ability to change time delays more rapidly, and, for some special applications, the ability to control the amplitude and phase of each spectral component of the delayed signals.

Figure 11:
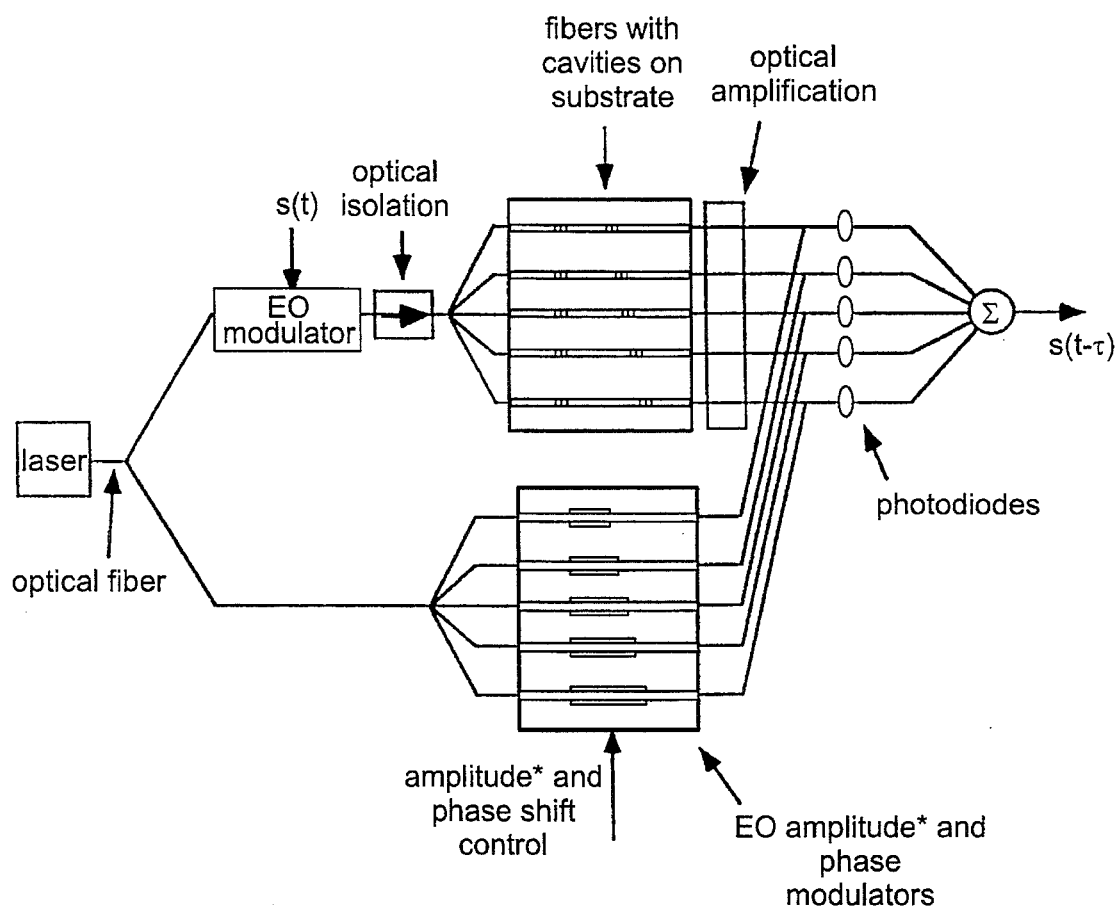
FIG. 11 shows an example of the use of fiber optic cavities to time delay a signal.

FIG. 11 shows an example of the use of fiber optic cavities to time delay a signal.

The signal to be delayed may be represented by s(t), where the amplitude of the signal is a function of time t.

In the illustrated example, coherent light from a CW laser is coupled into a single mode fiber. A distributed feedback (DFB) laser is preferably used in order to obtain an optical linewidth much narrower than the bandwidth of the signal to be delayed.

As shown in FIG. 11, a splitter divides the light into two fibers, one fiber branching into the signal channelizer leg and the other into the time delay control leg.

Within each of these two paths the light is further split into a number of channels with one reference channel corresponding to each of the signal path channels. Heterodyne detection between each of the signal path channels and a corresponding reference path channel takes place on a wideband photodiode.

As shown in FIG. 11, in the signal channelizer leg the light is modulated by the signal to be delayed, s(t), in an electro-optic modulator. The effect of the modulation of the laser light is to broaden the spectral line of the laser light to that of the bandwidth of the signal.

In the illustrated example, the modulated light then passes through an optical isolator to eliminate optical signals reflecting back from the channelizer portion of the signal channelizer leg.

Figure 12:
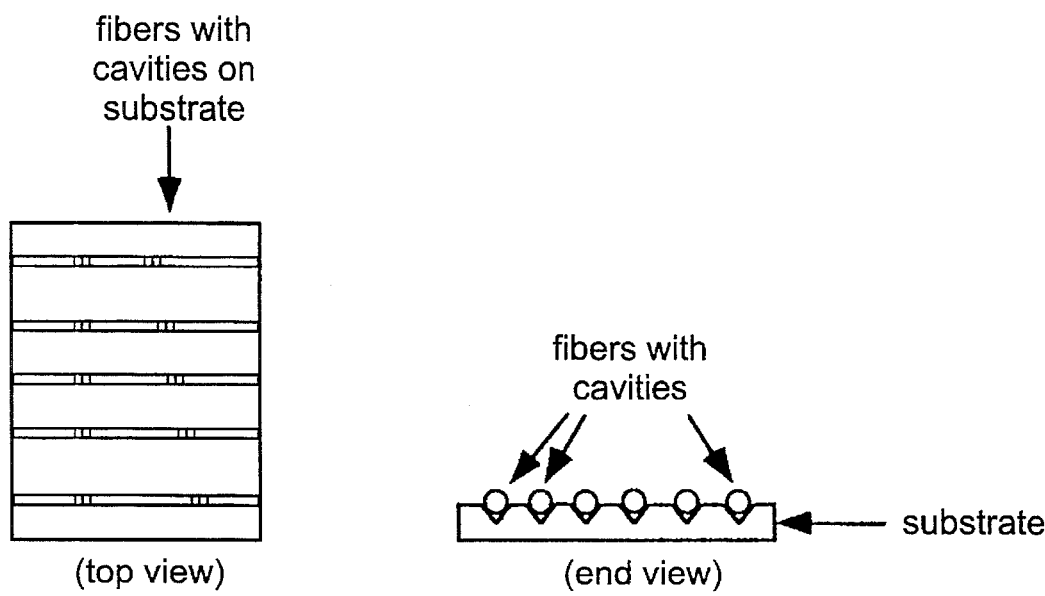
FIG. 12 shows an example of a fiber optic channelizer.
Figure 13:
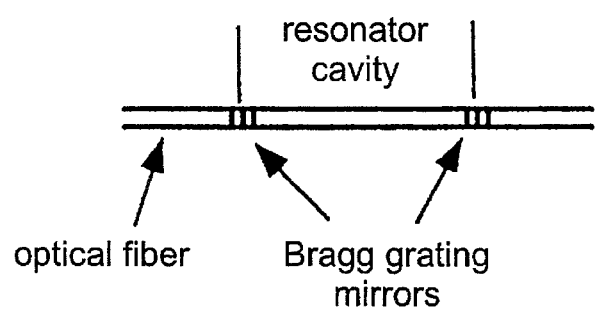
FIG. 13 shows an example of a fiber optic cavity.

As shown in FIG. 11, after passing through the optical isolator the light enters the channelizer portion of the signal channelizer leg. The light is then split into N fibers which enter the channelizer, an example of which is shown in FIG. 12. Each of the N optical channels contains a resonant cavity, an example of which is shown in FIG. 13, that accepts only a fraction (preferably 1/N) of the bandwidth of the optical signal, that portion whose frequency matches the resonant frequency of the cavity.

A preferred way of constructing the cavities is to write Bragg reflection gratings into optical fibers, with one Bragg grating mirror defining each end of the resonant cavity. Bragg gratings with reflectivities as high as 0.999 can be written into the fiber. Only that light that is in the pass band of each of the cavities will enter the cavity and pass on through. The other portion of the light will be reflected back by the first Bragg grating mirror, and will be deflected out of the fiber by the optical isolator. As illustrated in FIG. 11, for example, the length of each of the cavities is different so that each cavity passes a different spectral component of the signal.

Optionally, the light exiting from each of the optical fiber cavities may be amplified by an optical amplifier.

In the illustrated embodiment, the spectral component out of each of the resonators is coupled to a photodiode for heterodyne detection with a phase shifted reference.

Figure 14:
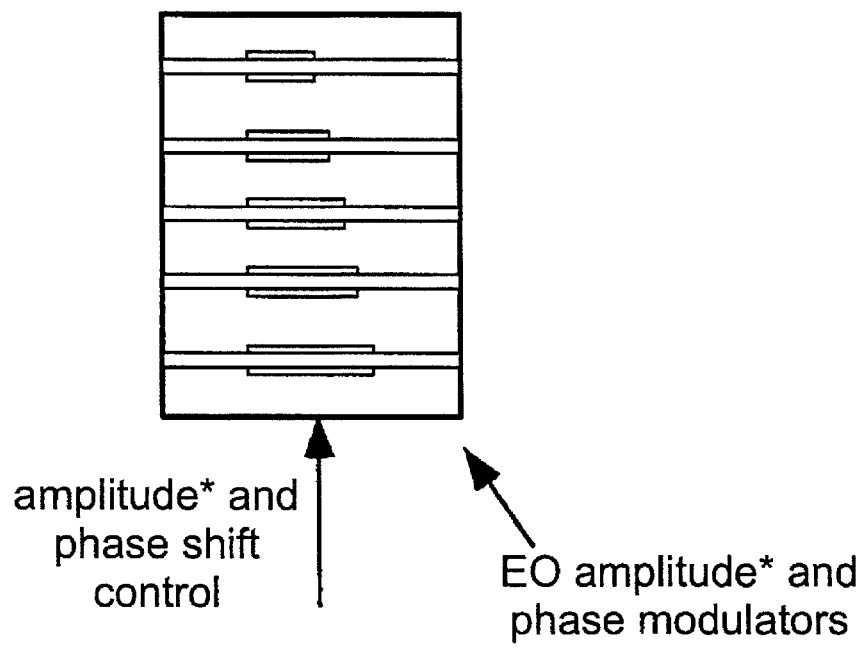
FIG. 14 shows an example of an electro-optic phase shift module.

In the time delay control leg, the unmodulated laser light is directed to an electro optic phase shift module, an example of which is shown in FIG. 14, one module per time delay signal to be generated.

The optical signal entering a phase shift module is divided into N optical channels, each phase shift channel corresponding to a spectral channel in the signal channelizer leg. An electrical controlling signal, or multiple control signals, determines the phase shift of the optical beam passing through each of the optical wave guides of the phase shift module. Preferably, the phase shifts are proportional to the center frequencies of the corresponding spectral channels of the signal channelizer leg. The phase shift module is preferably an integrated electro-optic device.

Each of the phase shifted optical reference signals is summed with the corresponding spectral component of the optical signal from the signal channelizer leg, and the sum detected on a high speed photodiode. The result of this heterodyne detection of a spectral component of the signal with a phase shifted reference is to phase shift the spectral component of the signal.

The electrical outputs of the photodiodes are summed. Preferably, the phase shift of each of the components of the reference signal is proportional to the center frequency of the corresponding spectral component of the signal. In this case the electrical signal out of the summer is a time delayed replica of the signal driving the modulator in the signal channelizer leg. The amount of time delay is proportional to the ratio the of phase change to frequency change from one spectral channel to the next.

For the preferred case of delaying a signal without introducing frequency dependent distortion, the phase shift module can be constructed such that one electrical control signal will maintain the proper linear relationship between the phases. For the case that the delays are being used to steer an RF array, it may be desired for spectrally dependent adaptive beamforming applications to allow for specially determined general relationships between the phases in addition to amplitude control of the spectral components. In this embodiment two controls may be required for each channel, one to control phase the other to control amplitude.

Figure 15:
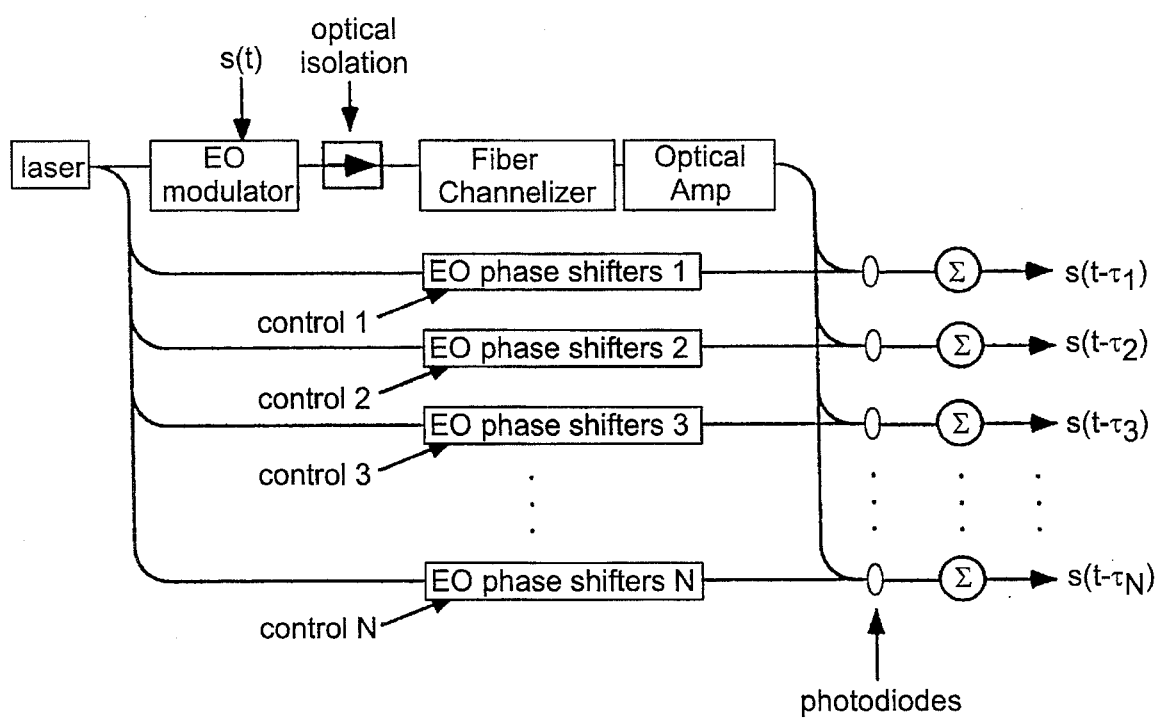
FIG. 15 shows an example of generating N time delays with a fiber optic cavities channelizer.

FIG. 15 shows an example of a configuration for simultaneously generating N time delayed signals. To simultaneously generate the different time delays, each of the frequency components of the spectrum of the signal to be delayed, as obtained from the fiber optic channelizer, is phase shifted by different relative amounts.

The following paragraphs provide a mathematical description of how a system such as that shown in FIG. 11 may generate and control continuously variable time delays.

An optical resonator, such as an optical fiber cavity or a Fabry-Perot etalon, contains many time replicas of a signal. It therefore is possible to obtain a time delayed replica of a signal from optical resonators. The principle of how this is accomplished is based on the fact that a time delayed version of a signal can be obtained by phase shifting each spectral component of the signal by an amount that is proportional to the frequency of that component and to the desired time delay, i.e., $$S(f) = \int s(t) \cdot e^{-j2\pi ft} dt \quad (1)$$

$$s(t-\tau) = \int S(f) \cdot e^{-j2\pi f\tau} \cdot e^{j2\pi ft} df \quad (2)$$

where t=time,

τ=time delay, f=frequency, s(t)=time domain signals assumed to be real, $S(f)e^{j2\pi ft}$=spectrum of the signal as obtained optically, 2πfτ=phase shift that is applied to each spectral component of the signal, s(t-τ)=time delayed replica of signal s(t).

Optical resonators may be considered channelizers. Therefore optical resonators can be used to optically obtain the spectral components of the signal. The spectral components, in optical form, are heterodyne detected with wideband photodiodes. The phase of the reference signal used in the heterodyne detection is proportional to the frequency component and the desired time delay and is of the form $-2\pi f\tau$ so that the detected output summed over the photodiodes is a time delayed replica of the signals being channelized. In mathematical form, the summed output of the detectors is $$D(t) = \frac{1}{2} \sum_k |S(f_k)e^{j2\pi f_k t} + e^{j2\pi f_k \tau}|^2 \quad (3)$$

$$= \frac{1}{2} \sum_k [|S(f_k)e^{j2\pi f_k t}|^2 + |e^{j2\pi f_k \tau}|^2 + 2 \cdot Re(S(f_k)e^{j2\pi f_k (t-\tau)})]$$

$$D(t) = \text{bias} + s(t - \tau) \quad (4)$$

where $$s(t - \tau) = Re\left[\sum_k S(f_k)e^{j2\pi f_k (t-\tau)}\right] \quad (5)$$

where Re[] denotes the real part of the quantity enclosed in brackets.

Examples of values of key fiber cavity parameters that would satisfy the top level requirements for true time delay beamforming are presented here.

An arbitrarily chosen set of requirements may be the following:

Signal bandwidth=10 Ghz,

Maximum time delay=20 nanoseconds,

Number of channels=1000.

The first parameter selected is reflectivity of the Bragg gratings. A reflectivity of 0.999 is chosen. Gratings with reflectivities greater than 99.9% can be patterned in standard communication fiber [Erdogan, T. and V. Mizrahi, "Fiber Grating Technology Grows", *IEEE LEOS Newsletter*, pp. 14–18, February 1993].

Given the reflectivity, the length of the cavity is chosen next in order to obtain time delays up to the maximum indicated values. Unless compensated for by adjustments, for example by adjusting the amplitude of the reference signal, longer delayed signals are attenuated relative to shorter delayed signals. This is due to the fact that there is less old optical signal in the cavity than new signal, since a little leaks out each round trip across the cavity. The attenuation of the optical signal by absorption and scattering in the fiber is negligible for the time delays of interest, assuming an appropriate operating wavelength is chosen. The maximum time delay is that at which the power of the delayed signal would be down 3 dB compared with no delay, if no compensations were made. It should be noted that this power loss can be easily compensated for, though probably at a small degradation in noise figure. The optical path length of the cavity that is found to satisfy the stated requirements is approximately 0.87 cm.

Of concern is the separation between adjacent resonant frequencies, which need to be greater than the signal bandwidth. Given the approximate lengths of the cavities the operating optical wavelength must be chosen in order to determine the separation between adjacent resonant frequencies. Ideal candidate optical wavelengths to use are approximately 1.3 and 1.5 μm, corresponding to local minima in attenuation in the fiber versus optical wavelength. A wavelength of 1.5 μm is chosen. This is a wavelength at which fiber optic communications technology is developing. With the selected length of the cavities of 0.87 cm and an optical wavelength of 1.5 μm, the separation between adjacent resonant frequencies is found to be 35 GHz which is greater than the bandwidth of the signal being delayed.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for generating at least one time delay signal from an input signal, comprising the elements A-H:

A) a source of coherent light,

B) divider means for dividing the light into at least a first leg and a second leg, C) modulation means for modulating light in the first leg by a signal, D) optical isolator means for preventing light in the first leg from being reflected back towards the source of coherent light, E) signal channelizer means for dividing modulated light in the first leg into a plurality of spectral components, F) signal control means for dividing light in the second leg into a plurality of paths and for shifting the phase of light in each of the plurality of paths to thereby generate a plurality of phase-shifted optical reference signals, each one of the plurality of phase-shifted optical reference signals corresponding to one of the plurality of spectral components, G) detection means for detecting each one of the plurality of phase-shifted optical reference signals together with a corresponding one of the spectral components and for generating an output signal, and H) summation means for summing output signals generated by the detection means.

2. The system of claim 1, comprising at least one single mode optical fiber for guiding light between at least two of the elements A-H.

3. The system of claim 1, wherein at least one of the divider means, the signal channelizer means, and the signal control means comprises an optical coupler.

4. The system of claim 1, wherein the modulation means comprises an electro-optic phase modulator.

5. The system of claim 1, wherein the modulation means comprises an electro-optic Mach-Zender interferometer modulator.

6. The system of claim 1, wherein the signal channelizer means comprises a plurality of optical resonant cavities.

7. The system of claim 6, wherein at least one of the optical resonant cavities defines a first end and a second end and wherein a mirror is positioned substantially at at least one of the first end and the second end.

8. The system of claim 7, wherein the mirror comprises a Bragg reflection grating.

9. The system of claim 6, wherein at least one of the plurality of optical resonant cavities defines an optical path length and further comprising adjustment means for adjusting the optical path length of the optical resonant cavity.

10. The system of claim 9, wherein the cavity includes electro-optic material and defines an index of refraction, and wherein the adjustment means comprises means for applying an electrical voltage across the electro-optic material in the cavity to modify the index of refraction of the cavity.

11. The system of claim 10, wherein the adjustment means comprises means for controlling optical amplification in the cavity.

12. The system of claim 6 wherein at least one of the plurality of optical resonant cavities defines an input end and wherein the system further comprises means for reusing light reflected from the input end of the optical cavity.

13. The system of claim 12, wherein the means for reusing light reflected from the input end of the optical cavity comprises at least one multiple-port optical circulator.

14. The system of claim 1, wherein the detection means comprises an array of photodiodes.

15. The system of claim 1, wherein the means for shifting the phase of light in each of the plurality of paths comprises an electro-optic phase modulator.

16. The system of claim 15, wherein the phase modulator comprises means for generating one signal which provides a different phase shift to light in each of the plurality of paths.

17. The system of claim 15, wherein the phase modulator comprises means for independently controlling the phase of light in each of the plurality of paths.

* * * * *